US010195511B2

(12) United States Patent
Dolige et al.

(10) Patent No.: US 10,195,511 B2
(45) Date of Patent: Feb. 5, 2019

(54) SYSTEM FOR COLLECTING DATA FOR GOLF

(71) Applicant: UL INVEST S.à.r.l., Luxembourg (LU)

(72) Inventors: Jean-Pierre Dolige, l'Etang la Ville (FR); Pascal Useldinger, Fourqueux (FR)

(73) Assignee: UL INVESTMENTS S.ÀR.L., Luxembourg (LU)

( * ) Notice: Subject to any disclaimer, the term of this patent is extended or adjusted under 35 U.S.C. 154(b) by 277 days.

(21) Appl. No.: 14/901,122

(22) PCT Filed: Jun. 25, 2014

(86) PCT No.: PCT/FR2014/051603
§ 371 (c)(1),
(2) Date: Dec. 28, 2015

(87) PCT Pub. No.: WO2014/207384
PCT Pub. Date: Dec. 31, 2014

(65) Prior Publication Data
US 2016/0158626 A1 Jun. 9, 2016

(30) Foreign Application Priority Data
Jun. 25, 2013 (FR) ..................... 13 56093

(51) Int. Cl.
A63B 71/06 (2006.01)
A63B 69/36 (2006.01)
(Continued)

(52) U.S. Cl.
CPC ...... A63B 71/0669 (2013.01); A63B 24/0003 (2013.01); A63B 57/00 (2013.01);
(Continued)

(58) Field of Classification Search
None
See application file for complete search history.

(56) References Cited

U.S. PATENT DOCUMENTS 6,030,109 A 2/2000 Lobsenz
2004/0073325 A1 4/2004 Reeves
(Continued)

FOREIGN PATENT DOCUMENTS

JP 2003-339929 A 12/2003

OTHER PUBLICATIONS

International Search Report for Corresponding Application No. PCT/FR2014/051603; dated Feb. 6, 2015.
(Continued)

Primary Examiner — James S McClellan
Assistant Examiner — Peter Iannuzzi
(74) Attorney, Agent, or Firm — Pearne & Gordon LLP

(57) ABSTRACT

A system (1) for collecting data for golf, includes: a first detection system (11) which includes a portable sensor (15, 37) and is suitable for generating a first determination signal (19, 41) representing a time likely to correspond to the hitting of a golf ball; a second detection system (12) for determining whether a sound is likely to correspond to the hitting of a golf ball (4) by a golf club (3) used by a golfer (2), and for generating a second determination signal (25) representing a time that is likely to correspond to the hitting of a golf ball; a processing means (20) for receiving the first and second determination signals (19, 41, 25), comparing same, determining an event (27) of the golf club (3) hitting a golf ball (4) in the event of a positive result from the comparison, and storing the event (27) in a memory unit (28).

23 Claims, 5 Drawing Sheets

(51) Int. Cl.
*A63B 57/00* (2015.01)
*G09B 19/00* (2006.01)
*A63B 24/00* (2006.01)
*H04M 1/725* (2006.01)

(52) U.S. Cl.
CPC .......... *A63B 69/36* (2013.01); *G09B 19/0038* (2013.01); *A63B 69/3632* (2013.01); *A63B 2220/40* (2013.01); *A63B 2220/833* (2013.01); *A63B 2220/836* (2013.01); *A63B 2225/50* (2013.01); *H04M 1/7253* (2013.01)

(56) References Cited

U.S. PATENT DOCUMENTS

2005/0282650 A1 12/2005 Miettinen et al.
2010/0144456 A1* 6/2010 Ahern ................... A63B 57/00
 473/222

OTHER PUBLICATIONS

Notification of Reasons for Rejection dated Feb. 20, 2018 for corresponding Japanese Application No. 2016-520730.

* cited by examiner

SYSTEM FOR COLLECTING DATA FOR GOLF

FIELD OF THE INVENTION

The present invention relates to the technical field of systems for collecting data for golf.

More precisely, the invention relates to the matter of reliability in the determination of the event which is the hitting of a golf ball by a golf club, insofar as any detection system can be interfered with by an external event.

BACKGROUND OF THE INVENTION

In the prior art various systems are known which aim at determining the event which is the hitting of a golf ball by a golf club.

The patent U.S. Pat. No. 6,030,109 describes such a device. Said patent relates to a device for the automatic incrementing of the number of hits produced by one or more golfers on a golf course. A sound sensor, which has to be situated a short distance from the ball, for example on the ankle of a user, coupled to a processing means, makes it possible to detect the particular sound emitted by a golf club hitting a golf ball. Such a device, in addition to the disadvantage of having to be situated a short distance from the golf ball, which is neither practical nor comfortable, is not very reliable with regard to determining the time of the actual hitting of the golf ball by the user's golf club and with regard to the fact that detected noise corresponds well to an actual hit by the golfer in question.

As a variant, the document US 2005/282,650 describes a computer worn on the wrist, the detection of the occurrence of a golf hit and the recording of an item of data relating to the game of golf. However, interference detections of false occurrences of golf balls, like the test shots carried out by the golfer without a ball, are likely falsify the recording of the data.

US 2004/073,325 describes a system for detecting the hitting of a golf ball by sound sensing. This document also describes a system of tracking of the golf club by detection of an inaudible air modulation signal.

BRIEF SUMMARY OF THE INVENTION

The purpose of the present invention is to enhance the reliability of the detection of the event which is the hitting of a golf ball by a golf club used by a golfer.

For this purpose, the invention principally proposes a system for collecting data for golf, comprising:
  a first detection system comprising a portable sensor and adapted for determining if a displacement of the portable sensor is likely to correspond to the hitting of a golf ball by a golf club used by a golfer equipped with the portable sensor, and for generating a first determination signal representative of a time likely to correspond to the hitting of a golf ball,
  a second detection system adapted for determining whether a vibration is likely to correspond to the hitting of a golf ball by a golf club used by a golfer, and for generating a second determination signal representative of a time that is likely to correspond to the hitting of a golf ball,
  a processing means adapted for receiving the first and second determination signals, comparing them, determining an occurrence of the golf club hitting a golf ball in the event of a positive result of the comparison, and recording said occurrence in a memory.

Thus, thanks to these arrangements, the simultaneous processing of the first and second determination signals allows the determination of the occurrence of the hitting of the golf ball by the golf club reliably and safely.

According to one embodiment, the second detection system is adapted for determining if a sound is likely to correspond to the hitting of a golf ball by a golf club used by a golfer.

According to one embodiment, the second detection system comprises a vibration sensor adapted for determining if a vibration is likely to correspond to the hitting of a golf ball by a golf club used by a golfer.

According to one embodiment, the portable sensor comprises an accelerometer and the first detection system is adapted for determining if a displacement of the accelerometer is likely to correspond to the hitting of a golf ball by a golf club used by a golfer equipped with the accelerometer.

According to one embodiment, the portable sensor comprises a sound sensor and the system comprises a plurality of sound emitters each of which can be associated with a golf club, and wherein the first detection system is adapted for determining if a sound is likely to correspond to one of the sounds emitted by one of the sound emitters associated with each of the different golf clubs used by the golfer equipped with the sound sensor.

According to one embodiment, the portable sensor comprises an accelerometer and a sound sensor and the system comprises a plurality of sound emitters each one of which can be associated with a golf club, and the first determination system is adapted for determining if a displacement of the accelerometer is likely to correspond to the hitting of a golf ball by a golf club used by a golfer equipped with the accelerometer and for determining if a sound is likely to correspond to one of the sounds emitted by one of the sound emitters associated with each of the different golf clubs used by the golfer equipped with the sound sensor, the first detection system alternatively using the accelerometer or the sound sensor as a function of the golf club used by the golfer or if there is acceleration that is too low.

According to one embodiment, comparing the first and second determination signals comprises the comparison between a time representative of the first determination signal and a time representative of the second determination signal.

According to an additional embodiment, the portable sensor is an accelerometer.

According to one embodiment, the processing means is adapted for recording in the memory, for at least one occurrence, an additional item of data associated with the occurrence.

According to one embodiment, the system comprises moreover one or more of the following objects:
  a clock determining a time,
  access to an item of data representative of the particular climatic conditions,
  a camera producing a video,
  and an additional item of data respectively comprises one or more of the following:
  a time determined by the clock,
  climatic conditions,
  a video produced by the camera.

According to one embodiment, the system comprises moreover at least one means of tracking adapted for identifying the type of golf club used during a hit, and wherein an additional item of data is the identified type of golf club.

According to one embodiment, the system comprises moreover a plurality of sound emitters each of which can be associated with a golf club, wherein the processing means comprises a database associating, for each sound emitted by said sound emitters, a type of golf club associated with the sound, and wherein said tracking means comprises a sound sensor.

According to one embodiment, the second detection system comprises the sound sensor of said tracking means.

According to one embodiment, the system comprises moreover at least one golf club, each one comprising a tracking label representative of the type of golf club and associated with the tracking means.

According to one embodiment, the tracking label comprises a sound emitter, the golf club comprising moreover a battery supplying the sound emitter with energy, a switch adapted for alternatively authorizing or prohibiting a transfer of energy from the battery to the sound emitter and a passive orientation detector adapted for controlling the switch as a function of the orientation of the golf club.

According to one embodiment, the system comprises moreover a system for determining the position of the golfer, and wherein the additional item of data comprises a position determined by the position determination system.

According to one embodiment, the system comprises at least one golf club and is characterized in that said golf club comprises moreover a position detector of the system for determining the position of the golfer.

According to one embodiment, when the processing means determines the occurrence of a hit, said processing means records the additional item of data.

According to one embodiment, the processing means comprises at least one application adapted for analyzing the data recorded in the memory.

According to one embodiment, the portable sensor is in a bracelet, or in a glove, adjustable to a member of the golfer, and is characterized in that the first detection system is adapted for determining if the displacement of the portable sensor is likely to correspond to a movement of the member of the golfer when he hits a golf ball with a golf club.

According to one embodiment, said tracking means is housed in the bracelet.

According to one embodiment, the portable sensor is integral with the golf club used by the golfer.

According to one embodiment, the processing means is at least partially housed in the bracelet.

According to one embodiment, the processing means comprises a first portion housed in the bracelet, a remote second portion housed outside of the bracelet and a communication system adapted for making the first and second portions communicate with each other.

According to one embodiment, the first detection system comprises a database of signals representative of hittings of a golf ball by a golf club, and is characterized in that the first detection system comprises a comparator adapted for comparing a signal emitted by the portable sensor with signals stored in the database, and for generating a determination signal representative of a time when a difference between the emitted signal and one of the signals in the database of signals is less than a predetermined threshold.

According to one embodiment, the first detection system comprises a database associating a golf club with each frequency emitted by a sound emitter, and wherein the first detection system comprises a comparator adapted for comparing a third signal picked up by the sound sensor with data stored in the database and for generating a determination signal representative of a time when a difference between the third signal picked up and one of the items of data in the database is less than a predetermined threshold.

According to one embodiment, the second detection system comprises a database of signals representative of sounds picked up during hittings of a golf ball by a golf club, and wherein the second detection system comprises a comparator adapted for comparing a signal emitted by the second detection system with signals stored in the database, and for generating a determination signal representative of a time when a difference between the emitted signal and one of the signals in the database of signals is less than a predetermined threshold.

According to one embodiment the bracelet houses at least one of the following:

the clock, when the additional item of data comprises a time determined by the clock, the position determination system, when the additional item of data comprises a position determined by the position determination system, a comparator, when the first and/or the second detection system comprises a comparator adapted for comparing an emitted signal with signals stored in the database, a battery for supplying energy to one or more of the energy consuming components housed in the bracelet.

BRIEF DESCRIPTION OF THE DRAWINGS

The figures and drawings will now be described briefly.

DESCRIPTION OF EXAMPLE EMBODIMENTS

A detailed description of several embodiments of the invention accompanied by examples and with reference to the drawings is given below.

Figure 1:
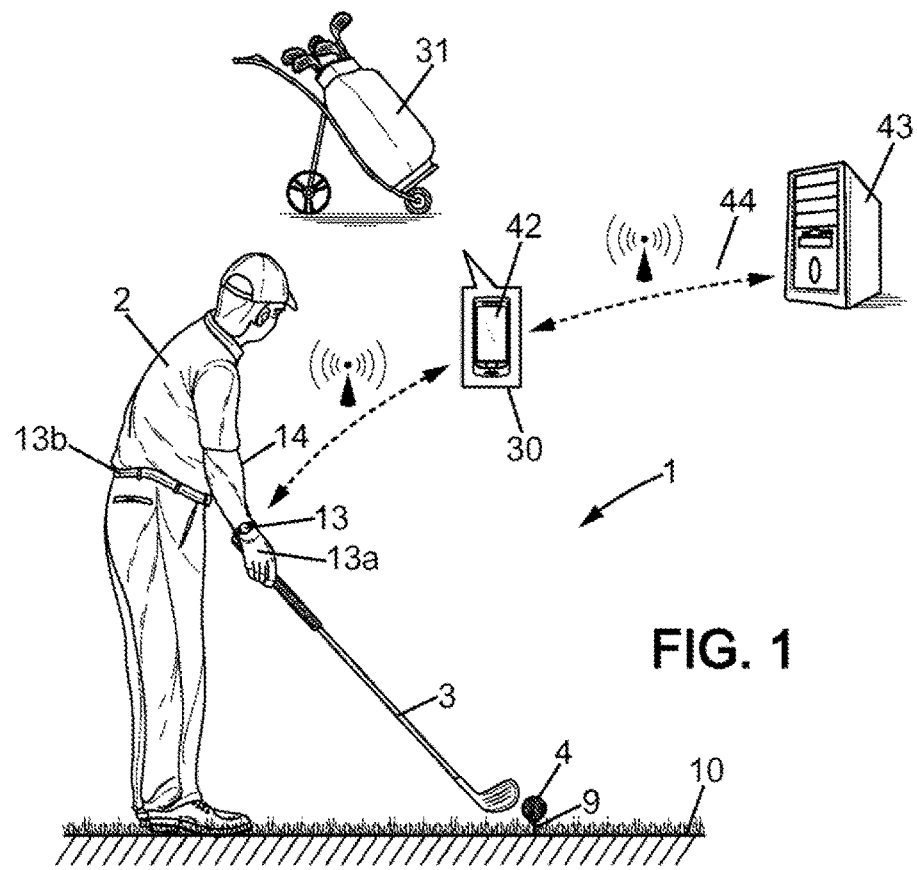
FIG. 1 is a general diagram of the system for collecting data according to the invention.

FIG. 1 is an overall view of an embodiment of the system 1 for collecting data on a golf course according to the invention and, solely on the intervention of a golfer 2, a powering up of the system 1 for collecting data on a golf course.

Figure 2:
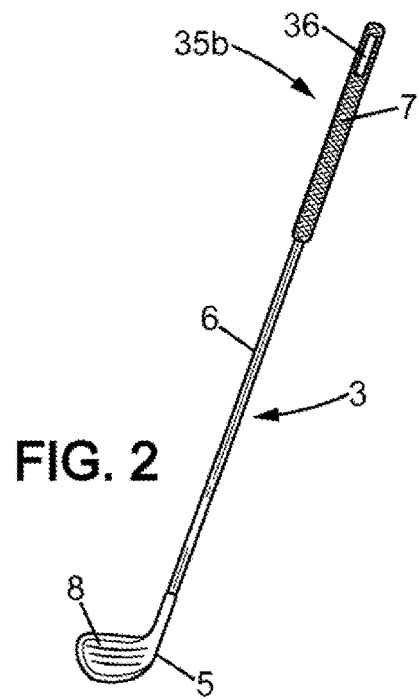
FIG. 2 is a general view of a golf club equipped with a tracking means according to the invention.

In a conventional game situation on a golf course, the golfer 2 uses one of his golf clubs 3 to hit a golf ball 4 with the objective of successively placing that golf ball 4 in each one of the eighteen holes of the golf course, and doing this whilst carrying out the least possible number of hits. The golf clubs 3 are essentially grouped in three large families, the irons family, the woods family and the putter family, but this list is not exhaustive and the golfer 2 may bring onto the same golf course only a series of fourteen golf clubs 3 to be distributed between said families of golf clubs 3. Traditionally, as seen in FIG. 2, the golf club 3 comprises a club head 5, a stick 6, also called a shaft, which is for example made of tubular metal or graphite extending between the club head 5 and the top part of the golf club, and a grip 7, for example made of rubber or of synthetic leather, by which the golfer holds the golf club 3 and which covers a part of the shaft 6, notably an upper part. Moreover, the club head 5 comprises a part, grooved or not, which comes into contact with the golf ball 4 and which is called the face 8 of the club. Said face 8 of the club has a loft angle with respect to the vertical of the shaft 6, or loft, in degrees. The irons have club heads 5 made of steel, iron, graphite or any other appropriate material, and are essentially divided into three families as a function of the loft of their chub faces 8: the short irons (sand wedge, pitching wedge, 9 iron), the medium irons (8, 7 and 6 irons) and the long irons (5, 4, 3, 2 and 1 irons). The woods have club heads 5 actually made of titanium or of composite materials and are used for long shots. Finally the putter is only used for short distant shots principally on a green close to a hole and the club head 5 has a loft very close to the vertical limit.

When the golfer 2 begins to play from a teeing ground, the golf ball 4 can be placed on a tee 9 or on the ground 10. However, when the user hits the golf ball 4 on a fairway (well-mown grassy area, separating the teeing ground from the green), the use of a tee 9 is prohibited.

Figure 3:
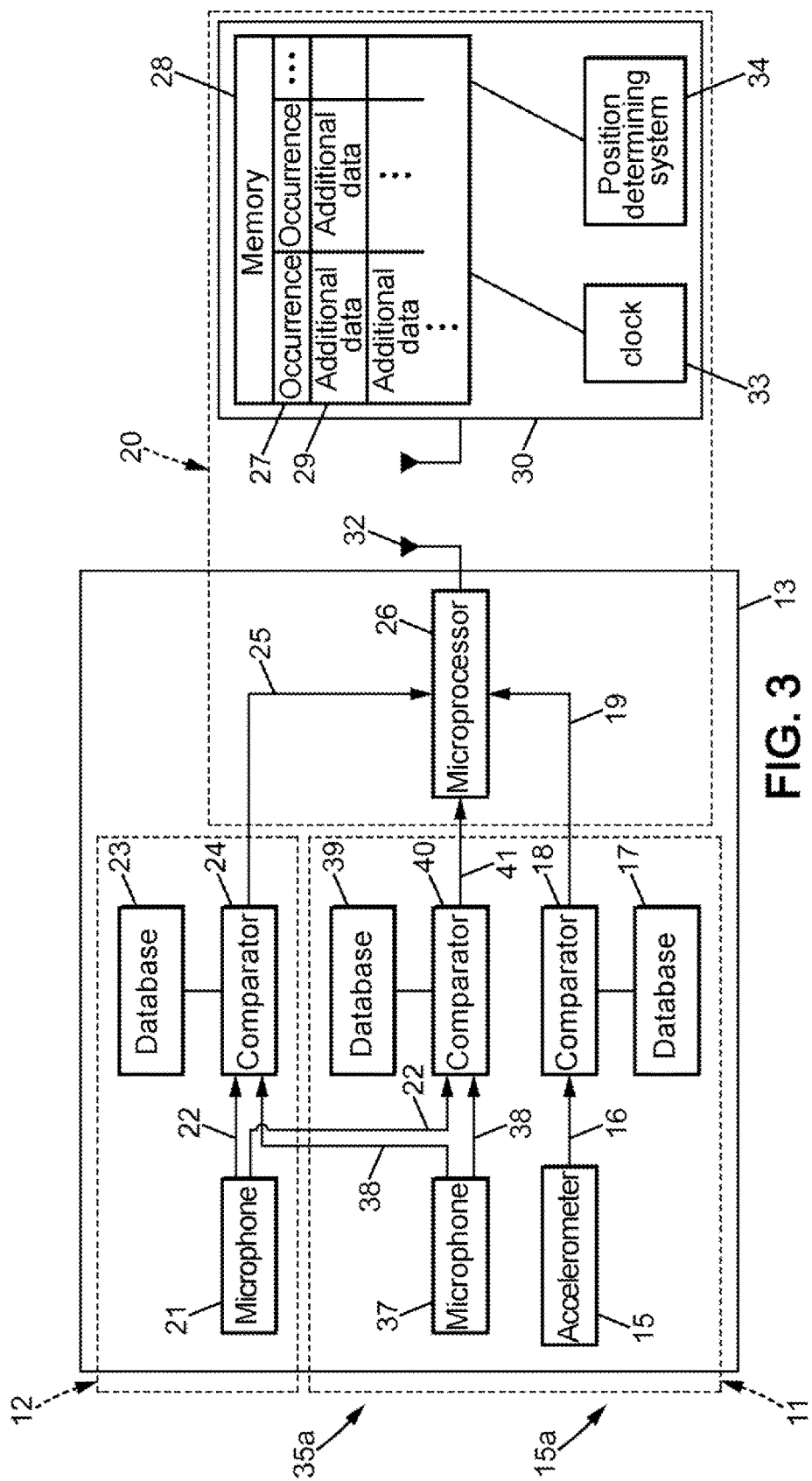
FIG. 3 is a block diagram of a bracelet and of a mobile computer according to the invention.

The system 1 for collecting data for golf comprises two detection systems 11 and 12 (FIG. 3):

The first detection system 11 makes it possible to determine a time $t_1$ likely to correspond to the hitting of a golf ball 4 by a golf club 3 used by a golfer 2. The first detection system 11 is housed in a receptacle transportable by the golfer 2 over the golf course and preferably housed in a bracelet 13. Said bracelet 13 is situated on a member of the golfer 2, preferably such as an arm or a forearm 14 and possibly close to the wrist of said golfer 2. The bracelet 13 can be made of leather, steel, titanium, plastic or any other appropriate material with or without a clasp. Optionally, the bracelet can be integrated in a watch. Optionally, the first detection system 11 is housed in a glove 13a worn by the golfer 2 or housed in a belt 13b worn by the golfer 2. Again as a variant, the first detection system is integral with a golf club 3. It can in particular be integrated in the upper part of the latter. It can be integrated in the shaft or in the grip. It can be integrated far from the head of the club, in order not to an effect on the actual hitting of the ball by modification of the moment of inertia of the club or on the sensations of the player.

The first detection system 11 comprises a means of perception of a movement 15a. Said means of perception of a movement 15a comprises a portable sensor 15. The portable sensor 15 is, for example, an accelerometer 15. Said accelerometer 15 has the function of detecting a movement of the golfer 2 corresponding to a hitting of the golf ball 4. A suitable example is for example a detection of acceleration of the arm or of the forearm 14 of the golfer 2. In fact, when the golfer 2 wishes to hit the golf ball 4 with a golf club 3, said golfer 2 carries out a movement called a swing. The movement (swing) breaks down into three parts, a first part called a backswing, a second part called a downswing, which consists of swinging the golf club 3 down again in order to come into contact with the golf ball 4 in order to arrive at the third part, called the finish. This movement will notably depend on the golfer 2 himself (in comparison with other golfers), on the place where the golfer 2 has placed the accelerometer 15 (left or right wrist, forearm 14, club . . . ) and on the type of shot to be carried out. Throughout the use of the system 1, said accelerometer 15 generates a first signal 16.

The means of perception of a movement 15a comprises moreover a database 17 of signals containing a list of signals representative of hittings of golf balls 4 in different environments and by different golf clubs 3. The first detection system 11 comprises, optionally, a comparator 18, adapted for receiving and comparing the first signal 16 emitted by the accelerometer 15 with the different signals stored in the database 17 and for generating a first determination signal 19 that is variable over the course of time. The first determination signal 19 varies over the course of time between a positive state, when a difference between the first signal 16 emitted and one of the signals in the database 17 of signals is less than a predetermined threshold $S_1$ (it is probably a hit), and a negative state, when the difference between the first signal 16 emitted and all of the signals in the database 17 of signals is greater than the predetermined threshold $S_1$ (in all likelihood it is not a hit). The distance between two signals is determined by any appropriate means. The first determination signal 19 is then transmitted to a processing means 20.

A learning step can optionally be used. Thus, when the golfer 2 has been using the system 1 for a little while, said golfer 2 can initialize the recognition of his movements by the accelerometer 15 in order to associate the movements of the golfer 2 perceived by the accelerometer 15 as being movements of hitting a golf ball 4 by a golf club 3 in the database 17. If the golfer 2 decides not to initialize the recognition of his movements by the accelerometer 15, the database 17 initially comprises a list of typical movements of hitting the golf ball 4 by a golf club 3.

The second detection system 12 makes it possible to determine a time $t_2$ likely to correspond to a hitting of the golf ball 4 by a golf club 3 used by a golfer 2. The second detection system 12 is for example houses in the bracelet 13 preferably situated on the arm or the forearm 14 of the golfer 2 and possibly close to the wrist of said golfer 2.

The function of the second detection system 12 is to detect sounds produced in the environment of the golfer 2 and to determine if one of the detected sounds is likely to correspond to the sound produced by the golf club 3 when the face 8 of said club hits the golf ball 4. In fact, when the club face 8 of the golf club 3 hits the golf ball 4, an identifiable sound wave is emitted at the time of said hit.

The second detection system 12 comprises a sound sensor 21 adapted for perceiving said sound wave. The sound sensor 21 is, for example, a microphone. When the sound sensor 21 detects a sound, said sound sensor 21 generates a second signal 22. Alternatively, the sound sensor 21 has a location different from that of the first detection system 11 and is for example housed in the golf club 3 or in the belt 13b.

The second detection system 12 comprises moreover a database 23 of sound waves containing a list of the sound waves representative of hittings of different golf balls 4 in different environments and by different golf clubs 3. In fact, the sound emitted by the hitting of a golf ball 4 by a golf club 3 varies as a function of the characteristics of the golf ball 4 hit (densities, weights, etc.), as a function of the characteristics of the environment (the golf ball 4 is hit on a tee 9, on the wet or dry ground 10 etc), as a function of the different materials composing the golf ball 3, as a function of the loft angle of the club face 8 of said golf ball 3 and as a function of the speed of the head of the club and of the point of contact of the ball on the face of the club. The second detection system 12 optionally comprises a comparator 24 adapted for receiving and comparing the second signal 22 emitted by the sound sensor 21 with the different sound waves stored in the database 23 and for generating a second determination signal 25 that is variable over the course of time. The second determination signal 25 varies over the course of time between a positive state, when a difference between the emitted second signal 22 and one of the sound waves in the database of sound waves 23 is less than a predetermined threshold $S_2$ (it is probably a hit), and a negative state, when the difference between the second emitted signal 22 and all of the sound waves in the database 23 of sound waves is greater than the predetermined threshold $S_2$ (in all likelihood it is not a hit). The distance between the two signals is determined by any appropriate means. The second determination signal 25 is then transmitted to the processing means 20.

Alternatively, before the comparator 24 receives the second signal 22 emitted by the sound sensor 21, said sound sensor 21 is, for example, coupled at its output to an amplifier (not shown). Said amplifier is then itself coupled to a band pass filter (not shown) having a central frequency of fc. The central frequency fc of said band pass filter corresponds to a central frequency $fc_2$ of a frequency range Pf of the sound wave generally emitted during the hitting of a golf ball 4. The band pass filter thus makes it possible to detect the sound wave emitted by the hitting of the golf ball 4 in an environment comprising noise. Thus, the sound sensor 21 can comprise any suitable device for processing the detected sound wave.

Thus, although the golf ball 4 can be situated on the tee 9 or on the ground 10 at the time it is hit by the golf club 3, these different positions do not interfere with the sound wave emitted at the time the golf ball 4 is hit enough to reduce the reliability of the second detection system 12. The emitted sound wave remains substantially similar and the sound sensor 21 detects it similarly. Likewise, the sound wave emitted by the putter hitting the golf ball 4 on the green is detectable by the sound sensor 21 despite the weakness of the shock on impact.

A learning step can optionally be used. Thus, when the golfer 2 has been using the system 1 for a little while, said golfer 2 can initialize the recognition by the sound sensor 21 of the sounds emitted by the club heads 5 when said club heads 5 hit the golf ball 4, in order to associate said sounds perceived by the sound sensor 21 as being sounds of hitting a golf ball 4 by a golf club 3 in the database 23. If the golfer 2 decides not to initialize the recognition by the sound sensor 21 of the sounds emitted by the club heads 5 when said club heads 5 hit the golf ball 4, the database 23 initially comprises a list of typical sounds of hitting the golf ball 4 by a golf club 3.

As a variant, it is possible to use a type of sensor other than a sound sensor in the second detection system 12. In fact, sound in only a part of the vibratory wave resulting from the impact of the club on the ball and transmitted by the air from the place where the ball is hit to the place where the sensor is. As a variant, it is possible to use a vibration sensor other than a sound sensor, as long as the vibrations are transmitted from the golf head to the sensor. It is possible for example to use an accelerometer as a variant. The accelerometer can notably be integral with the golf club, for example with the upper part of the golf club. Thus, the vibrations resulting from the hit propagate easily in the golf club until they reach the vibration sensor. The presence of the vibration sensor in the upper portion of the golf club should not influence, as far as possible, the balance of the club. The use of such a variant greatly reduces the risk of detecting golf balls being hit by a neighboring golfer.

It is notably possible to use two accelerometers in the context of an embodiment described here. A first accelerometer detects the movement of the golfer. The second accelerometer detects the occurrence of an impact. Either two separate accelerometers are used or two different components of the same three-axis accelerometer.

A second aspect of the system 1 for collecting data for golf relates to the processing means 20. Said processing means 20 comprises a microprocessor 26. The microprocessor 26 is adapted for receiving the first determination signal 19 and the second determination signal 25 and then for comparing them. The comparison notably comprises the fact of placing the two determination signals in a common time reference and of comparing a time representative of where the first determination signal is positive and a time representative of where the second determination signal is positive (this comparison of times can be made by determining that a period between these two times is less than a certain threshold). When the microprocessor 26 simultaneously receives the first determination signal 19 in its positive state and the second determination signal 25 in its positive state, said microprocessor 26 creates an occurrence 27 of a hitting of a golf ball 4 by the golf club 3. Thus, each time that the microprocessor 26 simultaneously receives the first and second determination signals 19, 25, said microprocessor 26 creates a new occurrence 27. The microprocessor 26 is for example housed in the bracelet 13 worn by the golfer 2. "Simultaneously" is adapted to the circumstances. In fact, the duration of the two phenomena (acceleration (movement) and sound (vibration) of hits) is different and these two signals are also offset in time. Thus, if the time difference between the two determination signals is less than a certain predetermined threshold $S_3$, the two events are considered to be simultaneous. If the first detection system 11 sends a positive first determination signal 19 but not the second detection system 12, it is for example because the golfer 2 has made a movement similar to a golf swing, either naturally or for example in preparation for a shot. If the second detection system 12 sends a positive second determination signal 25, but the first detection system 11 does not, it is for example an interference sound, such as a hit by a neighboring golfer. Thus, these interfering events are naturally filtered out by the system without intervention by the golfer 2.

As a variant, the first determination signal could comprise a set of temporal data corresponding to times representative of where the comparator 18 gives a positive result, and the second determination signal could comprise a set of temporal data corresponding to the set of times representative of where the comparator 24 gives a positive result, if these two comparators use the same time reference. In this case, the microprocessor 26 determines an occurrence if a time of the first determination signal and a time of the second determination signal match.

The processing means 20 comprises moreover a memory 28 in which each of said occurrences 27 is recorded and a battery (not shown) for supplying energy to one or more of the energy consuming components in the bracelet 13 worn by the golfer 2.

The processing means 20 is adapted moreover for recording at least one additional item of data 29 associated with each of the occurrences in the memory 28, the recording of said at least one additional item of data 29 being subordinated to the recording of a new occurrence 27.

Alternatively, the processing means 20 comprises moreover a data processing tool 30 such as a mobile computer 30, said mobile computer 30 being either specially adapted for processing the data collected on a golf course or a commercial product such as, for example, a tablet or a Smartphone. The mobile computer 30 is either carried by the golfer 2 or situated close to said golfer 2 such as, for example, in a golf bag 31 present on the golf course.

The processing means 20 comprises moreover a communication system such as a transmitter 32, housed in the bracelet 13 worn by the golfer 2. The transmitter 32 is adapted for making the microprocessor 26 communicate with the mobile computer 30 and more particularly to allow the transmission of the occurrence 27 of the hitting of a golf ball 4 by the golf club 3, from the microprocessor 26 to the mobile computer 30, by an appropriate wireless link such as Bluetooth, a GSM (Global System for Mobile communications) chip, a radio chip or any other wireless communication technique.

Optionally, the processing means 20 comprises moreover a clock 33 capable of determining times and the memory 28 comprises, for each occurrence 27, an associated additional item of data 29 containing the time determined by the clock 33. The clock 33 is for example housed in the mobile computer 30 or in the bracelet 13 worn by the golfer 2.

Optionally, the processing means 20 comprises moreover a system for determining the position 34 of the golfer 2 capable of determining a geographic position of the golfer 2. The position determining system 34 comprises a position detector (not shown), for example based on GPS (Global Positioning System) data and the memory 28 comprises, for each occurrence 27, an additional item of data 29 containing the geographic position of the golfer 2 and determined by the position determining system 34. The system for determining the position 34 of the golfer 2 is for example housed in the golf club 3, in the bracelet 13 or in the mobile computer 30.

Optionally, the processing means 20 comprises moreover a camera (not shown) capable of producing a video and the memory 28 comprises, for each occurrence 27, an associated additional item of data 29 containing the video produced by the camera. The camera is for example housed in the mobile computer 30 or in the golf bag 31.

Optionally, the processing means 20 comprises moreover access to an item of data representative of particular climatic conditions (wind, rain . . . ) at the time determined by the clock 33 and the memory 28 comprises, for each occurrence 27, an associated additional item of information 29 containing the particular climatic conditions determined by the software. The access is for example a wireless data connection to a remote meteorological server, or an integrated device like a thermometer, anemometer, barometer, . . . . The software using the data link is for example housed in the mobile computer 30 or in the bracelet 13 worn by the golfer 2.

Optionally, the processing means 20 comprises moreover a first sensor (not shown) capable of determining the speed of a chub head 5 during the hitting of the golf ball 4 and the memory 28 comprises, for each occurrence 27, an associated additional item of data 29 containing the speed of the club head 5 determined by the first sensor. The first sensor is for example housed in the golf club 3 used by the golfer 2.

Optionally, the processing means 20 comprises moreover a second sensor (not shown) capable of determining an orientation of the club 5 during the hitting of the golf ball 4 and the memory 28 comprises, for each occurrence 27, an associated additional item of information 29 containing the orientation of the club head 5 determined by the second sensor. The second sensor is for example housed in the golf club 3.

In the case where the first and second detection systems are integral with the golf club, the microprocessor 26 can also be integral with the golf club and communicate directly with the mobile computer 30. Thus, depending on the embodiments, it is possible to dispense with the bracelet. The components of the system integrated in the golf club can be there permanently, in which case each one of the golf clubs can be equipped. This option allows great transparency of the system for the player. As a variant, an accessory is provided integrating the different components which can be firmly attached to the golf club without notably interfering with its use by the golfer. In this case, the accessory will be assembled with the golf club to be used at will and then disassembled in view of assembling it with another golf club. This option is more advantageous economically.

Moreover, the system 1 for collecting data for golf comprises a third aspect. Said third aspect relates to a tracking means $35_a$ adapted for identifying the type of golf club 3 used (1 iron, 2 iron, wood, putter . . . ) when the golf ball 4 is hit by the golf club 3. The tracking means $35_a$ is for example housed in the bracelet 13 worn by the golfer 2.

According to this aspect, an additional item of data 29 is the type of golf club 3 identified. The memory 28 comprises, for each occurrence 27, an additional item of data 29 containing the type of golf club determined by the tracking means $35_a$.

The golfer 2, at the start of a course, has a set of golf clubs 3 (a maximum of fourteen clubs) and each one of said golf clubs 3 is equipped with a tracking label $35_b$ (FIG. 2). The tracking label $35_b$ comprises a sound emitter, such as for example a piezoelectric buzzer 36, allowing a continuous sound emission. The piezoelectric buzzers 36 are housed in each of the shafts 6 of said golf clubs 3 and each one emits a specific frequency different from that of the other piezoelectric buzzers 36. Alternatively, the piezoelectric buzzers 36 are housed in each of the shafts 6 of said golf clubs 3.

Moreover, the tracking label $35_b$ can comprise, on each of said golf clubs 3, and for example housed in each of said shafts 6, a battery (not shown) for powering the piezoelectric buzzer 36, a passive orientation detector (not shown) making it possible to determine the actual times of use of said golf club 3 and a switch (not shown) controlled by said passive orientation detector and able to alternatively assume an active state in which the switch authorizes a transfer of energy from the battery to the piezoelectric buzzer 36 and an inactive state in which the switch prohibits the link between said battery and said piezoelectric buzzer 36.

In fact, in order to reduce the risk of interference between the different golf clubs 3 and to detect with certainty the frequency of the golf club 3 actually being used by the golfer 2, the battery powers the piezoelectric buzzer 36 solely when the golf club 3 is in the position of use, namely when the golf club 3 is in the vertical position, or close to the vertical, with the shaft 6 facing upwards. The golf club 3 does not therefore transmit when it is in the position of rest, namely when it is for example in an inverted vertical position, such as in the golf bag 31, or in the horizontal position. The passive orientation detector is subjected to the force of gravity in such a way that, depending on the orientation of the golf club 3, it switches on an electric circuit without itself consuming electric energy.

The tracking means $35_a$ comprises moreover a sound sensor 37 adapted for perceiving the determined frequency. The sound sensor 37 is, for example, a microphone and is housed in the bracelet 13 worn by the golfer 2. Optionally, if the sound detector 21 is used, the sound sensor 37 of the frequency of the piezoelectric buzzer 36 is the same as the sound sensor 21 used for detecting the sound emitted by the golf club 3 hitting the golf ball 4. In fact, these two signals (hitting golf balls 4 and identity of the golf club 3) can have spectra that are sufficiently different to be distinguished by the microphone. The golf clubs 3 can in particular emit signals that are inaudible to the human ear. When the sound sensor 37 detects a sound, said sound sensor 37 generates a third signal 38. When a golf club 3 is used, it is much closer to the microphone 37 than the other thirteen golf clubs 3.

Consequently, the amplitude of detected signal coming from the golf club 3 is very much greater than the possible amplitude of the signals coming from the other golf clubs 3. Thus, the detected signal can be associated with the type of golf club 3 used.

The tracking means 35$_a$ comprises moreover a database 39 associating a type of golf club 3 with each frequency emitted by a piezoelectric buzzer 36. The tracking means 35$_a$ optionally comprises a comparator 40 adapted for receiving and comparing the third signal 38 picked up by the sound sensor 37 with the data in the database 39 and for generating a tracking signal 41 containing the information on the type of golf club 3 used by the golfer 2. The tracking signal 41 is then transmitted to the memory 28 and recorded, for each occurrence 27, as an additional item of information 29.

Alternatively, the sound sensor 21 or the vibration sensor and the accelerometer 15 are in a standby state as long as the third signal 38 picked up by the sensor 37 does not correspond to one of the items of data in the database 39.

Optionally, a learning step can be used. Thus, when one of the golf clubs 3 is used for the first time by the golfer 2, said golfer 2 must initialize the recognition of the new golf club 3 by the bracelet 13 in order to associate the frequency emitted by the piezoelectric buzzer 36 contained in said new golf club 3 with the corresponding characteristics of said new golf club 3 in the database 39.

If the vibration sensor and/or the accelerometer are integrated in the golf club natively, the latter can transmit, superimposed on the detected acceleration signal, the identifier of the golf club definitively encoded in the latter.

When the actual hitting of the golf ball 4 by the golf club 3 is detected, the microprocessor 26, via the transmitter 32, sends the identification of the type of golf club 3 used to the mobile computer 30. The sending of this information can only take place when the hitting by the golf club 3 of the golf ball 4 is detected in order to avoid the false recording of types of golf club 3 that are not hitting the shot of interest to the golfer 2.

Another additional item of information that can be associated with the occurrence 27 is any item of data contained in the mobile computer 30, such as a sound, image or video file stored in the mobile computer 30. The association can be made via a drop-down menu in the mobile computer 30. The sound, image or video file is for example a commentary, a photograph or a video, respectively, recorded by the golfer and associated with the shot or with the location.

Alternatively, the first detection system 11, making it possible to determine the time $t_1$ likely to correspond to the hitting of a golf ball 4 by a golf club 3 used by a golfer 2, comprises the tracking means 35$_a$. The portable sensor is then, for example, the sound sensor 37. Said sound sensor 37 has the function of perceiving the determined frequency corresponding to the different sound emitters present on the different golf clubs 3. When the golfer 2 uses one of the golf clubs 3, the sound emitter 36 present in the golf club 3 generates a continuous sound emission at a determined frequency, said sound sensor 37 picks up the continuous sound emission and generates the third signal 38.

The first detection system 11 comprises moreover the database 39 associating a type of golf club 3 for each frequency emitted by the sound emitter 36. The first detection system 11 optionally comprises the comparator 40 adapted for receiving and comparing the third signal 38 picked up by the sound sensor 37 with data stored in the database 39 and for generating the first determination signal 41 variable over the course of time. The first determination signal 41 varies over the course of time between a positive state, when a difference between the third signal 38 picked up and one of the items of data in the database 39 is less than a predetermined threshold $S_3$ (it is probably a hit) and a negative state, when the difference between the third signal 38 picked up and all of the items of data in the data base 39 is greater than the predetermined threshold $S_3$ (in all likelihood it is not a hit). The distance between two signals is determined by any appropriate means. The first determination signal 41 is then transmitted to the processing means 20. In the present case, as long as the golfer 2 is holding the golf club 3 in a way which corresponds to the hitting of a shot, that is to say with a sufficiently close distance between the sound emitter 36 and the sound sensor 37, the comparator 40 should give a positive signal.

Optionally, a learning step can be implemented. Thus, when the golfer 2 has been using the system 1 for a little while, said golfer 2 must initialize the recognition of the different golf clubs 3 that he will use on a course by the sound sensor 37 in order to associate the sound emissions picked up by the sound sensor 37 as being sounds linked to the golf clubs used by the golfer 2 in the database 39.

Alternatively, the first detection system 11 comprises the tracking means 35*a* and the means of perception of a movement 15*a*. The portable sensor of the first detection system 11 comprises an accelerometer 15 and a sound sensor 37. The first determination system 11 is adapted for determining if a displacement of the accelerometer 15 is likely to correspond to a hitting of a golf ball 4 by a golf club 3 used by a golfer 2 equipped with the accelerometer 15. The first determination system 11 is moreover adapted to determine if a sound is likely to correspond to one for the sounds emitted by one of the sound emitters 36 present on each one of the different golf clubs 3 used by the golfer 2 equipped with the sound sensor 37. Optionally, the first detection system 11 alternatively uses the accelerometer 15 and the sound sensor 37, for example depending on the golf club 3 used by the golfer 2. The first detection system 11 uses the accelerometer 15 for detecting long shots and the sound sensor 37 for detecting short shots.

Figure 4A:
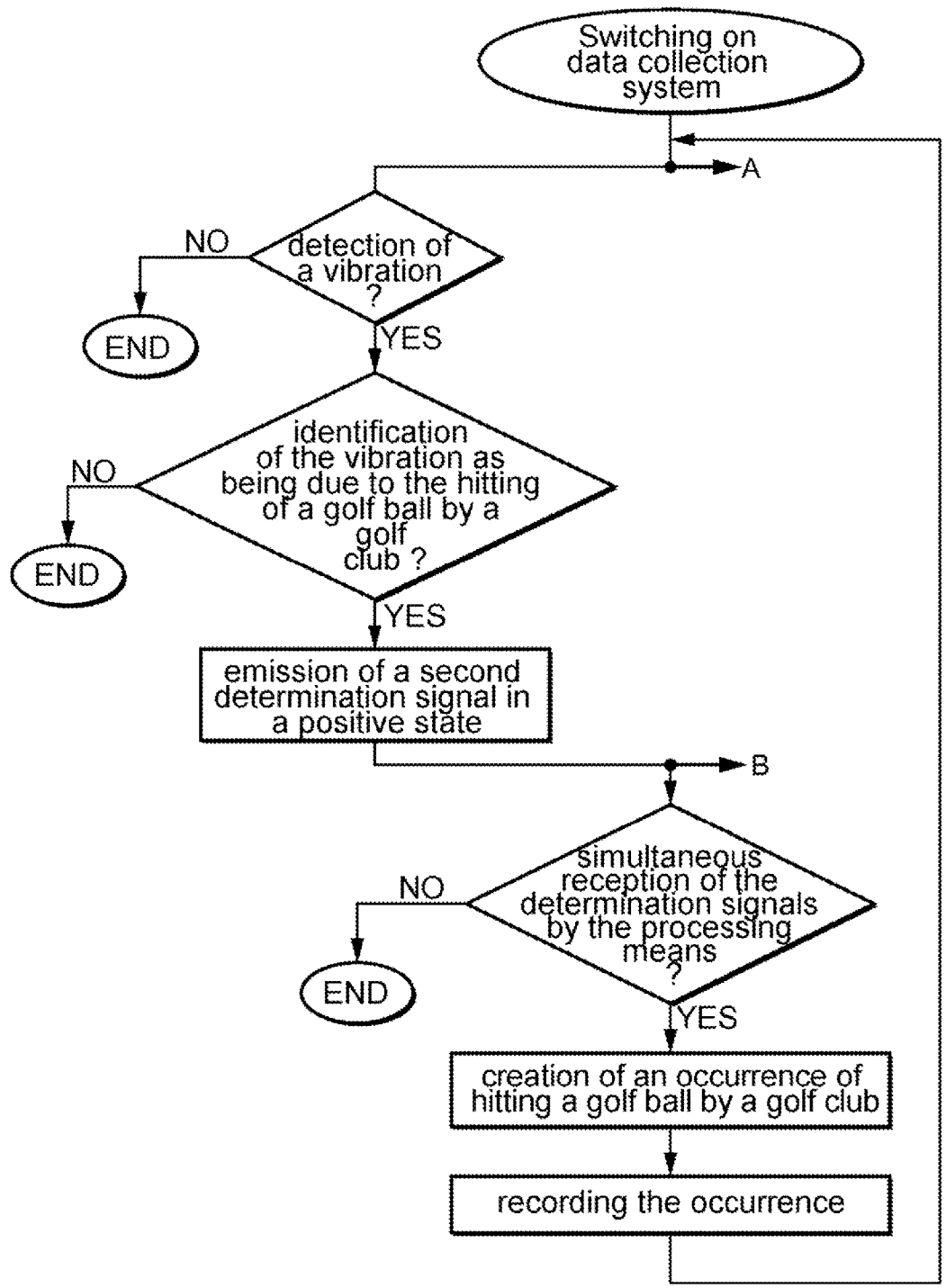
FIGS. 4A, 4B, 5 and 6 are flowcharts illustrating the chaining of the operations carried out throughout the use of the data collection system shown in FIG. 1 by a golfer.
Figure 4B:
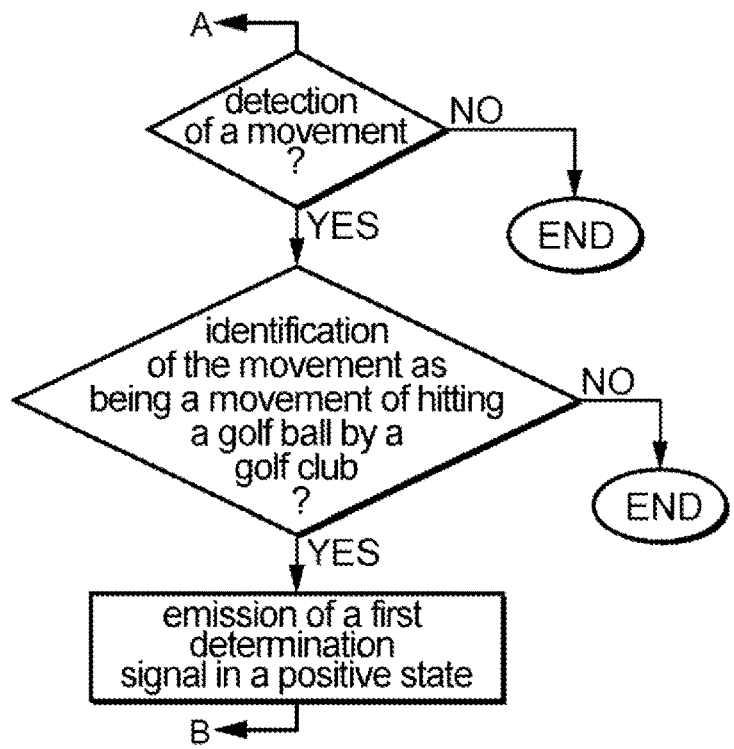
Figure 5:
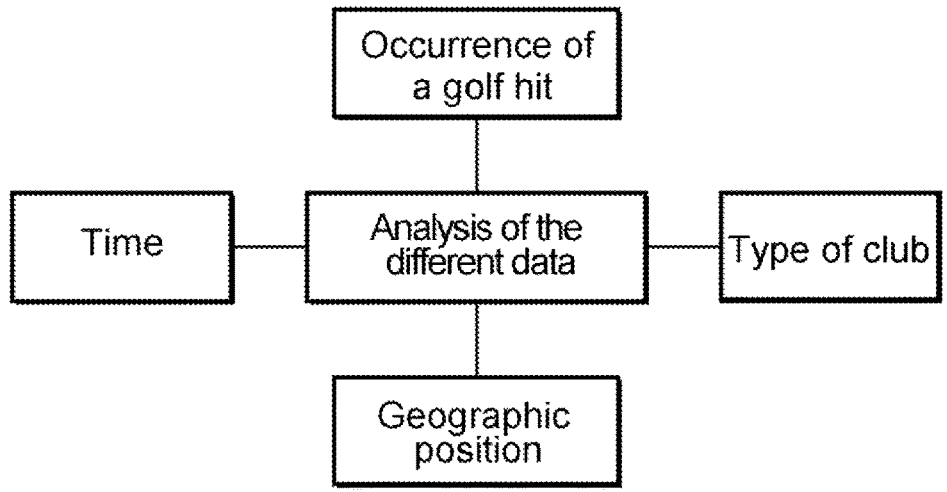
Figure 6:
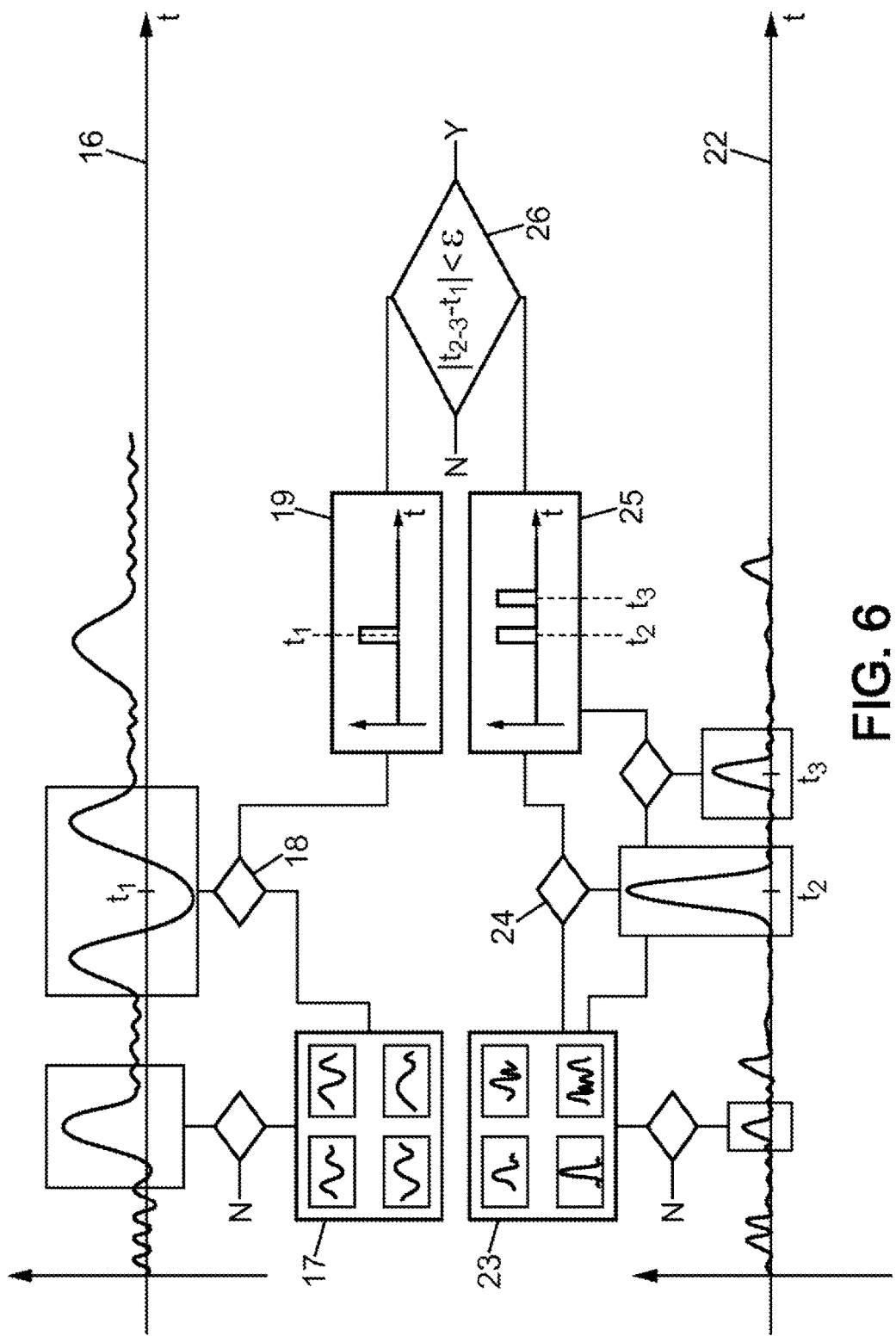

The system 1 which has just been described operates as follows (FIGS. 4A and 4B):

Before starting a given course, the golfer 2 equips himself with the system 1 and switches on the different components of said system 1. In this case it is a matter of equipping himself with the bracelet 13 carrying the portable sensor 15 and the sound sensor 21 and, if necessary, starting a dedicated application on his mobile computer 30 or tablet. The application can require authentication if the user already has a user account, or the creation of a user account. An association of the bracelet 13 with the mobile computer 30 may be necessary, by software configuration in order to ensure that the mobile computer 30 correctly receives the data from the bracelet 13 worn by the golfer 2 and not from neighboring golfers. As a variant, no bracelet is used and all of the components provided for the bracelet are integrated in the golf clubs.

A learning step may be necessary. In this case for example it is a matter of associating each golf club 3 of the golfer 2 with a given type of golf club 3. In order to do this, the golfer puts the system into a learning mode (for example by pressing a given button on the bracelet). Then he associates each golf club with its identifier in the system. For example, he can use each golf club in a given order and each time indicate which club it is on the mobile computer 30. It can also be a matter of hitting one or two typical shots whilst wearing the bracelet 13 so that the portable sensor 15 can more easily associate the movements carried out with shots, notably depending on the place where the portable sensor 15 is fixed and so that the sound sensor 21 can more easily associate the sounds picked up with sounds emitted during hits, notably as a function of the distance between the sensor and the place of the hit or the orientation of the sensor.

The golfer then signals the end of the learning, using a dedicated button for example.

If necessary, the golfer indicates via the application which course he wishes to use. The application can then access a database relating to the course in question and comprising information relating to the course such as, for example, data relating to the shots made by the golfer or by other golfers on that same course in the past.

When the golfer 2 prepares to hit a golf ball 4, he chooses a golf club 3 and places himself in a playing position in front of said golf ball 4. The passive orientation detector then detects that the golf club 3 moves from its position of rest to its position of use and changes the switch from its inactive state to its active state in which it authorizes the transfer of energy between the battery and the sound emitter 36. The battery then powers the sound emitter 36 and said sound emitter 36 emits a frequency that it its own frequency. Said emitted frequency is picked up by the sound sensor 37 of the bracelet 13 worn by the golfer 2 and the microprocessor 26 of said bracelet 13 identifies which golf club 3 is currently in the position of use according to a comparison between the frequency obtained by means of the sound sensor 37 and the content of the previously recorded database 39. Alternatively, the sound sensor 37 and the microprocessor 26 are situated in the belt 13b worn by the golfer 2, integrated in a smartphone, in the golf club, or just on the outside of the golf club.

When the golfer 2 carries out the swing movement in order to hit a golf ball 4 with a golf club 3, his arm 14 undergoes a movement of acceleration, and the accelerometer 15, situated in the bracelet 13 worn by said golfer 2, detects said acceleration and generates the first signal 16. Alternatively, the accelerometer 15 is situated in the glove 13a or on the golf club 3. The comparator 18 of the first detection system 11 continuously compares the signal 16 emitted by the accelerometer 15 with the different sounds stored in the database 17 and generates the first determination signal 19 to be sent to the processing means 20. If the difference between the first signal 16 emitted and one of the signals in the database 17 of signals is less than the predetermined threshold $S_1$, the first determination signal 19 is modified, changing from a first logic level indicating an absence of displacement of the accelerometer 15 likely to correspond to a hitting of a golf ball 4 by the golf club 3, to a second logic level indicating a presence of a displacement of the accelerometer 15 likely to correspond to a hitting of a golf ball 4 by a golf club 3.

In parallel, when the face 8 of the golf club 3 of the golfer 2 hits the golf ball 4, an identifiable sound is emitted at the time of said hit. The sound sensor 21, situated in the bracelet 13 worn by said golfer 2, continuously detects the sound and generates the second signal 22. The comparator 24 of the second detection system 12 continuously compares the signal 22 emitted by the sound sensor 21 with the different sound waves stored in the database 23 and continuously generates the second determination signal 25 to be sent to the processing means 20. If the difference between the second signal 22 emitted and one of the sound waves in the database 23 is less than the predefined threshold $S_2$, the second determination signal 25 is modified, changing from a first logic state, indicating an absence of picking up a sound likely to correspond to one of the sounds emitted by one of the sound emitters 36 associated with each of the different golf clubs 3, to a second logic state indicating a presence of a sound likely to correspond to one of said sounds emitted by one of the sound emitters 36.

As a variant, a vibration sensor is used for identifying a vibration corresponding to a hitting of a golf ball.

Alternatively, when the club face 8 of the golf club 3 of the golfer 2 hits the golf ball 4, an identifiable sound wave is emitted at the time of said hit. The sound sensor 21 continuously detects the sound and generates the second signal 22. When the comparator 24 received a signal (not shown) from the microprocessor 26 informing it that the first detection means 11 has generated a first determination signal 19, 41 representative of a time likely to correspond to a hitting of a golf ball 3, said comparator 24 of the second detection system 12 compares the signal 22 emitted by the sound sensor 21 with the different sound waves stored in the database 23. The comparator 24 generates the second determination signal 25 to be sent to the processing means 20 if the difference between the second signal 22 emitted and one of the sound waves in the database 23 of sound waves is less than the predetermined threshold $S_2$. This description also applies in the case of detection by a vibration sensor of a vibratory wave in the golf club instead of the detection of the sound wave by a microphone.

The processing means 20 then determines the occurrence 27 of a hit, and records this occurrence 27 in the memory 28. This determination is for example carried out by placing the two determination signals in a common time reference and checking that a period between a time where the first determination signal is positive and a time where the second determination signal is positive is less than a certain threshold period.

Thus, the hit carried out by the golfer 2 is taken into account if and only if the processing means 20 simultaneously receives the positive first determination signal 19 from the first detection system 11 and the positive second determination signal 25 from the second detection system 12, namely, in the embodiment shown, if and only if the microprocessor 26 simultaneously receives the information through the sound sensor 21 of the detection of the sound produced/of the vibration produced by the hitting of the golf ball 4 by the golf club 3 and the information through the accelerometer 15 of the detection of the movement of acceleration of the forearm 14 of the golfer 2.

In this way, when the golfer 2 carried out movements of preparation, the latter are not detected as hittings of the golf ball 4 by a golf club 3 because there is no contact between the golf ball 4 and the golf club 3. In the same way, when another golfer hits second golf balls with a second golf club, these shots are not detected as hits because there is no acceleration of the forearm 14 of the golfer 2. On receiving a positive determination signal coming from one of the comparators 18, 24, the microprocessor 26 defines a timeslot around the time of this reception. The microprocessor analyses the other determination signal by looking for a positive value of the latter in the timeslot. In the case where it is not found, no occurrence of hitting a golf ball is recorded.

The mobile computer 30 receives, from the bracelet 13 and for example via the transmitter 32 of said bracelet 13, or from the golf club, the information that the golfer 2 has just hit the golf ball 4 with his golf club 3. The mobile computer 30 then records a series of data including, for example, the fact that the golfer 2 has just made a hit. Moreover, the mobile computer 30 can determine its own GPS (Global Positioning System) position and then associate this hit with said GPS position as well as the time at which said mobile computer 30 receives the information of the hitting of the golf ball 4 by the golf club 3, and of the type of golf club 3.

If necessary, reading the identity of the golf club by the mobile computer is triggered by the detection of the occurrence of a shot. Thus, the connection between the processing means 20 and the mobile computer 30 can comprise tracking data of the club used.

The mobile computer 30 can comprise at least one application, such as an application downloadable from the internet, making it possible to carry out, in situ, analyses of said recorded data 27 and 29. Said applications make it possible, for each occurrence 27, for example, to calculate a distance traveled by the golf ball 4 between two successive recorded occurrences 27, to determine a directional accuracy and to determine the successive different geographic positionings of the different occurrences 27 over the course. The application thus has access to data representative of golf, and/or the golf course used by the golfer. By comparison of the position data associated with an occurrence of hitting a ball with a map representative of the golf course, the mobile computer can thus determine if a shot is to be associated with the preceding shot (it is the same hole), or if the shot marks the start of a new hole for the golfer. As a variant, the golfer can himself signal in any appropriate manner that he is starting a new hole. As a variant, the start of a new hole will be able to be determined by the mobile computer 30 by the use of a long range golf club again. Said applications moreover make it possible to determine a series of parameters for each hole and for each course such as for example the number of GPS points for each hole and for each course and a plot produced by the different shots. The results of the analyses are recorded in the memory 28.

Moreover, the mobile computer 30 comprises a screen 42 (FIG. 1). Said screen 42 makes it possible to display different results coming from the different analyses of said applications for example in the form analysis tables.

Once the results of the analyses are recorded, the mobile computer 30 optionally sends said recorded results to a remote server 43 by a wired link or by an appropriate wireless link 44 such as Wi-Fi, 3G, 4G, Bluetooth or by any other wireless communication technique (FIG. 1). Said remote server 43 processes said recorded results, displays said results, for example in the form of analysis tables, and stores said results in an internal memory.

Although the system 1 is automated, the golfer 2 has the possibility, at any time, of manually reworking the recorded data 27 and 29 directly on the mobile computer 30 or on the remote server 43 via a dedicated web interface. The golfer 2 can, for example add penalty points to a hole or to a course, withdraw a provisional golf ball 4 or indicate a drop. In particular, the last shot, sometimes causing the golf ball to move by only a few centimeters, can be inaudible and/or imperceptible by the movement detector, in which case it can be added by the golf player directly on the mobile computer 30.

Additionally, the mobile computer 30, via its communication with the remote server 43 and via a specific dedicated application, can advise the golfer 2 on different strategic choices. In order to do this, the mobile computer 30 compares individual personal data of the golfer 2 (current geographic position of the golfer 2, geographic position of an end of hole flag, sex of the golfer 2, age of the golfer 2, force and direction of the wind, rainfall level . . . ) with a history comprising all of the data already recorded on said golfer 2 and/or a list of reference data continuously completed by other golf players on that course. Once this comparison is made, the mobile computer 30 advises the golfer 2 on, for example, the type of shot to make, the type of golf club 3 generally used by other golf players in his situation and then, optionally, the mobile computer 30 compares the score made by the golfer 2 with the scores made by other golf players on the same hole as a function of their sex, their age, their level (professional or amateur) . . .

Additionally, the mobile computer 30, via a dedicated application, or the remote server 43 via the dedicated web interface, allows the golfer 2 to display on, for example, Google Earth, the latest courses played or his current geographic position. The golfer 2 also has the possibility of playing back a course with at least one of the scores of the golfer 2 when the golfer 2 has already played the course at least once, or with the average of the scores made by other golf players.

The application can be proper to each golf course, or group of golf courses belonging to a same manager, who will deal with the administration of the accounts of each user of the golf course or group of golf courses. Thus, if the data are stored on a server accessible to the golf course, the latter will be able to comprise a database relating to each one of the golfers having used the service on this golf course.

Thus, in addition to the aspect useful to the golfer, the application will allow the manager of the golf course to access the stored data for his own purposes.

Once the golf course is completed, the golfer 2 switches off the different components of said system 1.

The invention claimed is:

1. A system for collecting data for golf, comprising:
a first detection system comprising a portable sensor and adapted for generating a first determination signal representative of a first likelihood of a hitting of a golf ball;
a second detection system adapted for determining whether a vibration is likely to correspond to the hitting of the golf ball, the vibration being caused by the hitting of the golf ball with at least one golf club, and for generating a second determination signal representative of second likelihood of the hitting of the golf ball;
at least one tracking means adapted for identifying the at least one golf club used during the hitting of the golf ball;
the at least one golf club, one of the at least one golf clubs being used by a golfer to hit the golf ball, each golf club comprising:
a tracking label representative of the golf club and associated with the tracking means, the tracking label comprising a sound emitter that emits a sound associated with the golf club;
a battery supplying the sound emitter with energy;
a switch adapted for alternatively authorizing or prohibiting a transfer of energy from the battery to the sound emitter; and
a passive orientation detector adapted for controlling the switch as a function of the orientation of the golf club; and
a processing means adapted for:
receiving the first and second determination signals,
comparing the first and second determination signals,
determining an occurrence of the at least one golf club hitting the golf ball in the event of a positive result of the comparison,
recording said occurrence in a memory, and recording in the memory, for at least one occurrence, an additional item of data associated with the occurrence,
wherein the additional item of data comprises the identified golf club.

2. The system as claimed in claim 1, wherein the second detection system is adapted for determining if a sound is likely to correspond to the hitting of the golf ball by the at least one golf club.

3. The system as claimed in claim 1, wherein the second detection system comprises a vibration sensor adapted for detecting the vibration.

4. The system for collecting data for golf as claimed in claim 1, wherein the portable sensor comprises an accelerometer and wherein the first detection system is adapted for determining if a displacement of the accelerometer is likely to correspond to the hitting of the golf ball by the golf club used by the golfer.

5. The system for collecting data for golf as claimed in claim 1, wherein the portable sensor comprises a sound sensor, and wherein the first detection system is adapted for determining if a sensed sound is likely to correspond to the sound emitted by the sound emitter associated with the golf club used by the golfer.

6. The system for collecting data for golf as claimed in claim 1, wherein the portable sensor comprises an accelerometer and a sound sensor, and wherein the first determination system is adapted for determining if a displacement of the accelerometer is likely to correspond to the hitting of the golf ball by the golf club used by the golfer, and for determining if a sensed sound is likely to correspond to the sound emitted by the sound emitter associated with the golf club used by the golfer, the first detection system using either the accelerometer or the sound sensor depending on the golf club used by the golfer.

7. The system for collecting data for golf as claimed in claim 1, wherein comparing the first and second determination signals comprises comparing a time representative of the first determination signal and a time representative of the second determination signal.

8. The system as claimed in claim 1, further comprising one or more of the following objects:
    a clock determining a time,
    access to an item of data representative of the particular climatic conditions,
    a camera producing a video,
wherein the additional item of data respectively further comprises one or more of the following:
    the time determined by the clock,
    climatic conditions,
    the video produced by the camera.

9. The system as claimed in claim 1, wherein the processing means further comprises a database associating, for each sound emitted by said sound emitters, the golf club associated with the sound, and wherein said tracking means comprises a sound sensor.

10. The system as claimed in claim 9, wherein the second detection system comprises the sound sensor of said tracking means.

11. The system as claimed in claim 1, further comprising a system for determining the position of the golfer, wherein the additional item of data further comprises a position determined by the position determination system.

12. The system as claimed in claim 11, wherein said at least one golf club comprises a position detector of the system for determining the position of the golfer, the position detector being activated by the detection of the hitting of the golf.

13. The system as claimed in claim 1, wherein when the processing means determines the occurrence of the hitting of the golf ball, said processing means records the additional item of data.

14. The system as claimed in claim 1, wherein the processing means comprises at least one application adapted for analyzing the data recorded in the memory.

15. The system as claimed in claim 1 wherein the portable sensor is in a bracelet or a glove adjustable to a member of the golfer, and wherein the first detection system is adapted for determining if the displacement of the portable sensor is likely to correspond to a movement of the member of the golfer when he hits the golf ball with the golf club used by the golfer.

16. The system as claimed in claim 15, wherein the at least one tracking means is housed in the bracelet.

17. The system as claimed in claim 1, wherein the portable sensor is integral with the at least one golf club used by the golfer.

18. The system as claimed in claim 1, wherein the processing means is at least partially housed in a bracelet.

19. The system as claimed in claim 18, wherein the processing means comprises a first portion housed in the bracelet, a remote second portion housed outside of the bracelet and a communication system adapted for making the first and second portions communicate with each other.

20. The system as claimed in claim 5, wherein the first detection system comprises a database of signals representative of hittings of the golf ball by the at least one golf club, and wherein the first detection system comprises a comparator adapted for comparing a signal emitted by the portable sensor with signals stored in the database, and for generating a determination signal representative of a time when a difference between the emitted signal and one of the signals in the database of signals is less than a predetermined threshold.

21. The system as claimed in claim 6 wherein the first detection system comprises a database associating each of the at least one golf clubs with each frequency emitted by a sound emitter, and wherein the first detection system comprises a comparator adapted for comparing a third signal picked up by the sound sensor with data stored in the database and for generating a determination signal representative of a time when a difference between the third signal picked up and one of the items of data in the database is less than a predetermined threshold.

22. The system as claimed in claim 1, wherein the second detection system comprises a database of signals representative of sounds picked up during hittings of the golf ball by the at least one golf club, and wherein the second detection system comprises a comparator adapted for comparing a signal emitted by a sound sensor with signals stored in the database, and for generating a determination signal representative of a time when a difference between the emitted signal and one of the signals in the database of signals is less than a predetermined threshold.

23. The system as claimed in claim 16 wherein the bracelet houses at least one of the following:
    a clock determining a time,
    a position determination system that determines a position of the golfer,
    a comparator, a battery for supplying energy to one or more components housed in the bracelet that consume energy.

* * * * *

UNITED STATES PATENT AND TRADEMARK OFFICE
CERTIFICATE OF CORRECTION

PATENT NO.         : 10,195,511 B2
APPLICATION NO.    : 14/901122
DATED              : February 5, 2019
INVENTOR(S)        : Jean-Pierre Dolige and Pascal Useldinger Page 1 of 1

It is certified that error appears in the above-identified patent and that said Letters Patent is hereby corrected as shown below:

In the Claims

Column 17, Line 66, "The system as claimed in claim 11, wherein said at least one golf club comprises a position detector of the system for determining the position of the golfer, the position detector being activated by the detection of the hitting of the golf" should read, -- The system as claimed in claim 11, wherein said at least one golf club comprises a position detector of the system for determining the position of the golfer, the position detector being activated by the detection of the hitting of the golf ball. --

Signed and Sealed this
Thirtieth Day of April, 2019

Andrei Iancu
*Director of the United States Patent and Trademark Office*